United States Patent
Luukanen et al.

(10) Patent No.: US 6,242,740 B1
(45) Date of Patent: Jun. 5, 2001

(54) IMAGING SYSTEM FUNCTIONING ON SUBMILLIMETER WAVES

(75) Inventors: Arttu Luukanen, Helsinki; Heikki Sipila, Espoo; Veli-Pekka Viitanen, Veikkola, all of (FI)

(73) Assignee: Metorex International Oy, Helsinki (FI)

( * ) Notice: Subject to any disclaimer, the term of this patent is extended or adjusted under 35 U.S.C. 154(b) by 0 days.

(21) Appl. No.: 09/151,325

(22) Filed: Sep. 11, 1998

(30) Foreign Application Priority Data

Sep. 16, 1997 (FI) ........................................ 973699

(51) Int. Cl.$^7$ ............................................. H01L 31/0232
(52) U.S. Cl. .......................... 250/353; 250/349; 250/250
(58) Field of Search ................................... 250/353, 349, 250/250

(56) References Cited

U.S. PATENT DOCUMENTS

| | | |
|---|---|---|
| 3,742,235 * | 6/1973 | Boatner et al. ...................... 250/250 |
| 4,654,622 | 3/1987 | Foss et al. . |
| 5,047,783 | 9/1991 | Hugenin . |
| 5,171,733 | 12/1992 | Hu . |
| 5,227,800 | 7/1993 | Huguenin et al. . |
| 5,741,058 * | 4/1998 | Suzuki et al. ......................... 362/27 |
| 5,808,350 * | 9/1998 | Jack et al. ............................ 257/440 |
| 5,825,029 | 10/1998 | Agnese et al. . |
| 5,981,949 * | 11/1999 | Leahy et al. ......................... 250/332 |

FOREIGN PATENT DOCUMENTS

| | | |
|---|---|---|
| 354369 | 2/1990 | (EP) . |

OTHER PUBLICATIONS

Rebeiz, Gabriel M., "Millimeter–Wave and Terahertz Integrated Circuit Antennas," *Proceeding of the IEEE,* vol. 80, No. 11, pp. 1748–1769, Nov. 1992.

Goldsmith, P. F. et al., "Focal Plane Imaging System for Millimeter Wavelengths," *IEEE Transactions on Microwave Theory and Techniques,* vol. 41, No. 10, pp. 1664–1675, Oct. 1993.

Huguenin, G. R. et al., "Underground and Obscured Objective Imaging and Detection," *SPIE–The International Society for Optical Engineering,* vol. 1942, pp. 117–128, Apr., 1993.

Richards, P.L., "Bolometers for Infrared and Millimeter Waves," *J. Appl. Phys.,* vol. 76, No. 1, pp. 2–24, Jul., 1994.

* cited by examiner

Primary Examiner—Constantine Hannaher
Assistant Examiner—Otilia Gabor
(74) *Attorney, Agent, or Firm*—Rockey, Milnamow & Katz, Ltd.

(57) ABSTRACT

The invention relates to detection performed over millimeter and submillimeter wavelengths, especially to imaging solutions functioning over a submillimeter-wavelength range. The system of the invention uses detectors, comprising antenna coupled bolometers together with wavelength selective optics. The detector matrix is preferably curved for reducing the number of imaging errors. In order to provide a curved detector matrix, the detector matrix is constituted by flat submatrices, each being provided with one or more integrated antenna coupled bolometers. The detectable frequency range is preferably limited in two stages, first by means of wavelength selective optics and secondly by means of the operating band of the antenna of an antenna coupled bolometer. In order to focus the incoming radiation on bolometers, the bolometer substrate is fitted or the surface or interior of the bolometer substrate is provided with a bolometer lens or a corresponding optical element in alignment with each bolometer.

17 Claims, 4 Drawing Sheets

IMAGING SYSTEM FUNCTIONING ON SUBMILLIMETER WAVES

CROSS-REFERENCE TO RELATED APPLICATIONS

This application claims the benefit of priority under 35 U.S.C. Sec. 119 from Finnish patent application Ser. No. 973699, filed on Sep. 16, 1997.

FIELD OF THE INVENTION

The present invention relates to a system for observation performed on millimeter and submillimeter wavelengths, particularly to imaging systems functioning on a submillimeter wavelength range.

BACKGROUND OF THE INVENTION

At present, the search for hidden weapons and other smuggled articles is typically carried out by using metal detectors and physical frisking performed on a person. These methods have several downsides. Metal detectors are prone to produce false alarms, nor do they detect non-metallic objects, such as explosives and drugs. On the other hand, a physical frisking performed by the customs officer is tedious and slow. X-rays or other ionizing radiation cannot be used for the inspection of persons because of the health hazards caused by ionizing radiation. Indeed, there is a rapidly increasing demand for a non-contacting inspection method which is harmless for the subject and the inspector.

The non-contacting inspection of a subject is most often effected by using electromagnetic radiation or particle radiation. The interaction between radiation and tissue must be as insignificant as possible in order to provide an inspection method which is as safe as possible. In practice, tis requirement precludes the use of ionizing radiation, for example X-radiation, neutrons, or charged particles. The scattering of very low-energy X-radiation is used to some extend, but the health hazard associated even with that and the mere through of applying ionizing radiation for the inspection of people preclude the use of such systems. The equipment based on the application of ultrasound is completely safe, but the picture quality and resolution achieved thereby are not sufficiently good.

One highly promising procedure for the inspection of people and things is the use of submillimeter-range radiation. This range of the electromagnetic spectrum lies within the intermediate zone of long-wave infrared radiation and microwave radiation, wherein the radiation typically has a wavelength in the order of 100–1000 $\mu$m, a frequency of 0,3–3 THz, and a photon energy of 1,2–12 meV. Over this spectral area, most dielectric materials, such as clothes, paper, plastics, and leather, are almost transparent. By virtue of a relatively small wavelength, the diffraction hardly restricts the obtainable resolution, even with relatively small-aperture optics. One of the best features of this wavelength range is that the inspection can be carried out by using a totally inactive system, the examined object being the source of perceivable radiation.

All bodies emit electromagnetic radiation. The radiation emitted by bodies or things complies with a continuous spectrum is known as the black body radiation. The intensity of radiation depends on the temperature of a body and also very critically on how effectively the body radiates. This effectiveness, emissivity is close to one with water-containing material, such as skin. On the other hand; metals have an emissivity which is very close to zero. All other materials lie between these extremes and can be observed according to the radiometric temperature thereof. Metallic and many plastic bodies can be made to appear radiometrically "hot" or "cold" regardless of the bodies' own temperature, as such bodies emit very little radiation and reflect most of the thermal radiation falling thereon, which in turn can be "hot" or "cold". Water-containing materials emit very effectively and, respectively, reflect very little, whereby such materials at body temperature appear to be radiometrically "hot" when compared to bodies at room temperature. Such intensity differences can be measured with a sensitive detector, and a detector matrix can be used for producing an image of the measured object.

There are several different types of detectors functioning over a submillimeter range. The frequency range of radio technology based heterodyne and direct-detection receivers is restricted below 200 GHz with current technology. In addition to these, there are available several different types of bolometers and Golay's cells and pyroelectric detectors. Antenna coupled bolometers are highly suitable for imaging applications, as they have a good signal-to-noise ratio, they are fast by virtue of their low time constant and their manufacturing costs are low. The wavelength range for antenna coupled bolometers can be chosen quite freely, since the sensitivity over various wavelengths is essentially only defined by the design of the antenna.

The know technology functions typically over the range of 80 GHz to 140 GHz, since those frequencies enable the use of traditional microwave technology. This type of solutions are described e.g. in the article P. F. Goldsmith, C.-T. Hsieh, G. R. Huguenin, J. Kapitzky, E. L. Moore, "Focal Plane Imaging Systems for Millimeter Wavelengths", IEEE transactions on microwave theory and techniques, vol. 41, no. 10, Oct. 1993, pp. 1664–1675, as well as in Patent publications U.S. Pat. No. 5,047,783 and U.S. Pat. No. 5,227,800. The article G. R. Hugenin, C.-T. Hsieh, J. Kapitzky, E. L. Moore, K. D. Stephan, A. S. Vickery, "Contraband detection through clothing by means of millimeter-wave imaging", Proceedings of Underground and Obscured Object Imaging and Detection, 15–16 Apr. 1994, Orland, Fla. SPIE proceedings series vol. 1942, pp. 117–128, discloses a system which uses scanning image formation and functions over the 94 GHz frequency range. The traditional microwave technology has the downside that detectors are expensive and, thus, the manufacturing costs of a large detector matrix become very high. In addition, such detectors have a high power consumption. Another drawback with this frequency range is the fact that, as a result of a relatively long wavelength, the diffraction limits the resolution to a modest level.

Figure 1:
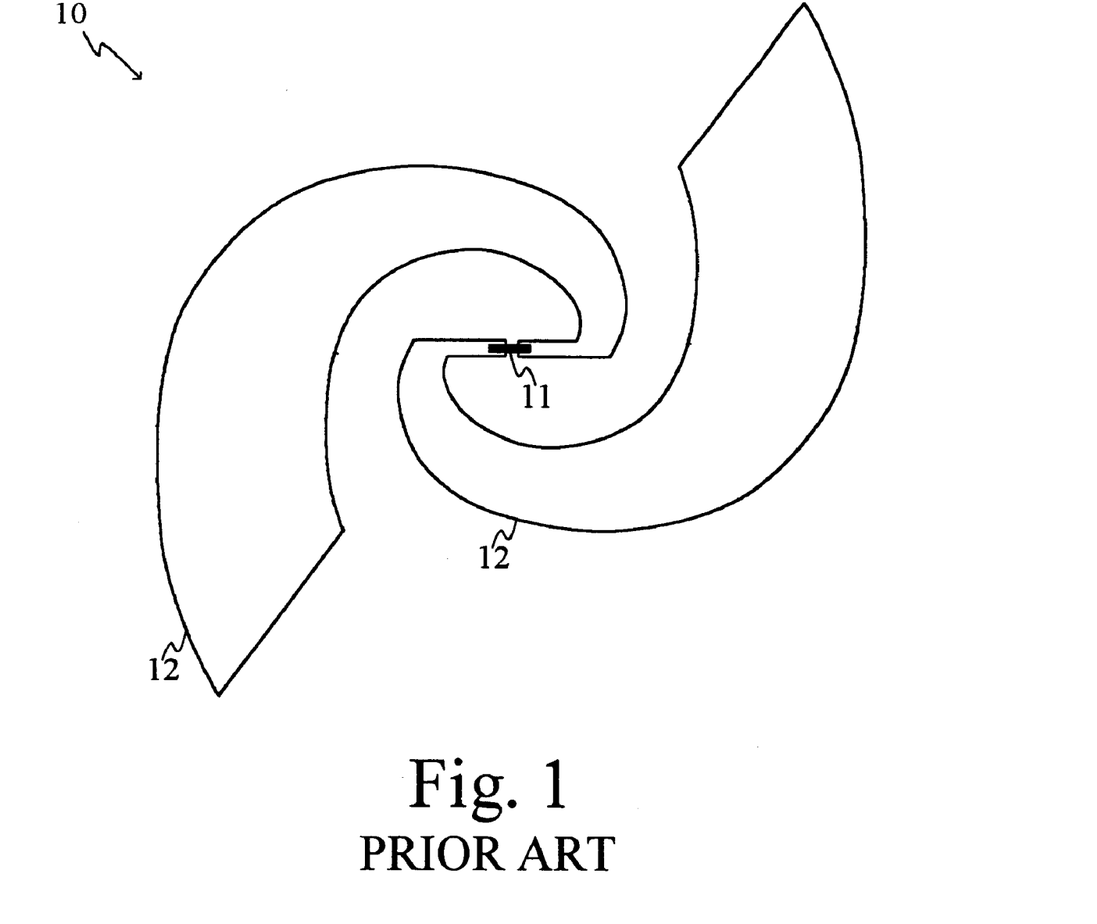
FIG. 1 shows a basic design for an antenna coupled bolometer.

FIG. 1 depicts a basic structure for an antenna coupled bolometer 10. The antenna coupled bolometer 10 consists typically of an antenna element, including two antenna branches 12 for receiving electromagnetic radiation, as well as of a bolometer element 11 for converting the received electromagnetic radiation into heat. The temperature change of the bolometer element 11 produced by the energy of electromagnetic radiation is detected as a change in the resistance of the bolometer element 11. The bolometer element may also consist of more than one component, whereby the thermalization resistance converting the energy of electromagnetic radiation into thermal energy and the temperature gauge of the thermalization resistance are separate components.

The antenna coupled bolometer is in principle broadband, but the bandwidth can be affected by the design of the branches 12 of the antenna element. There are a variety of prior known antenna element solutions, the design shown in FIG. 1 being but one example. In addition to the spiral design depicted in FIG. 1, prior known are e.g. a logperiodic design as well as an angular, dipole and double dipole design. Several of these antenna types function well also as complementary designs. Such complementary designs include e.g. a slot antenna, which is a complementary form to the dipole antenna, and a double slot antenna, which is a complementary form to the double dipole antenna. The selection of an antenna design can be used for affecting the characteristics of an antenna, and thereby those of an antenna coupled bolometer, such as for example the frequency band and directional pattern.

Various bolometer solutions, e.g. materials used therein, are described in the review type of article P. L. Richards, "Bolometers for infrared and millimeter waves", Journal of Applied Physics, 76 (1994) 1–24. Various other types of antenna solutions designed by using manufacturing techniques of integrated circuits are described for example in the article G. M. Rebeiz, "Millimeter-Wave and Terahertz Integrated Circuit Antennas", Proceedings of the IEEE, Vol. 80, No. 11, November 1992, pp. 1748–1769.

BRIEF SUMMARY OF THE INVENTION

An object of the invention is to provide an imaging system functioning on a submillimeter wavelength range. Another object of the invention is to provide a system, wherein the building of an image does not require scanning. An additional object of the invention is to provide a system, having a resolution which is higher than that of the prior art system. An object of the invention is further to provide a system according to the foregoing objects of the invention, having a power consumption which is lower than that of the prior art systems. A yet further object of the invention is to provide an image building system, which is simpler than the prior art solutions.

The objects are achieved by using detectors consisting of antenna coupled bolometers, which can be produced on a detector substrate in large numbers at a time with conventional manufacturing techniques of integrated circuits, and by providing a detector substrate or its surface with bolometer lenses or other adaptation elements for improving the coupling of electromagnetic radiation with the bolometers. The radiation is focused on the bolometers by means of a mirror or a lens, which preferably delimit the wavelength band of the electromagnetic radiation applied to the bolometers.

A system of the invention is characterized by that, that it comprises
  more than one detector, which detectors are antenna coupled bolometers,
  at least one substantially flat bolometer substrate, said detectors being provided on said at least one bolometer substrate,
  an optical element for collecting electromagnetic radiation and for focusing the same on said detectors, as well as
  at least one adaptation element for improving the coupling of the radiation directed to said at least one bolometer substrate, to said detectors.

The detectors used in a system according to the invention comprise antenna coupled bolometers together with wavelength selective optics. The detector matrix is preferably curved in order to reduce imaging errors. In order to provide a curved detector matrix, the detector matrix is compiled of flat submatrices, each of which is provided with one or more integrated antenna coupled bolometers. The detectable frequency range is preferably restricted in two stages, first by means of wavelength selective optics and secondly by means of the operating band of the antenna of an antenna coupled bolometer. In order to achieve the focusing of incoming radiation on the bolometers and its coupling as effective as possible, the bolometer substrate is fixedly provided or the bolometer matrix has its surface or interior provided with a bolometer lens or a corresponding optical element in line with each bolometer.

BRIEF DESCRIPTION OF THE DRAWING

The invention will now be described in more detail with reference made to preferred embodiments shown by way of example and to the accompanying drawings, in which.

DETAILED DESCRIPTION OF THE INVENTION

In he figures, the corresponding components are designated with corresponding reference numerals and characters.

Figure 2:
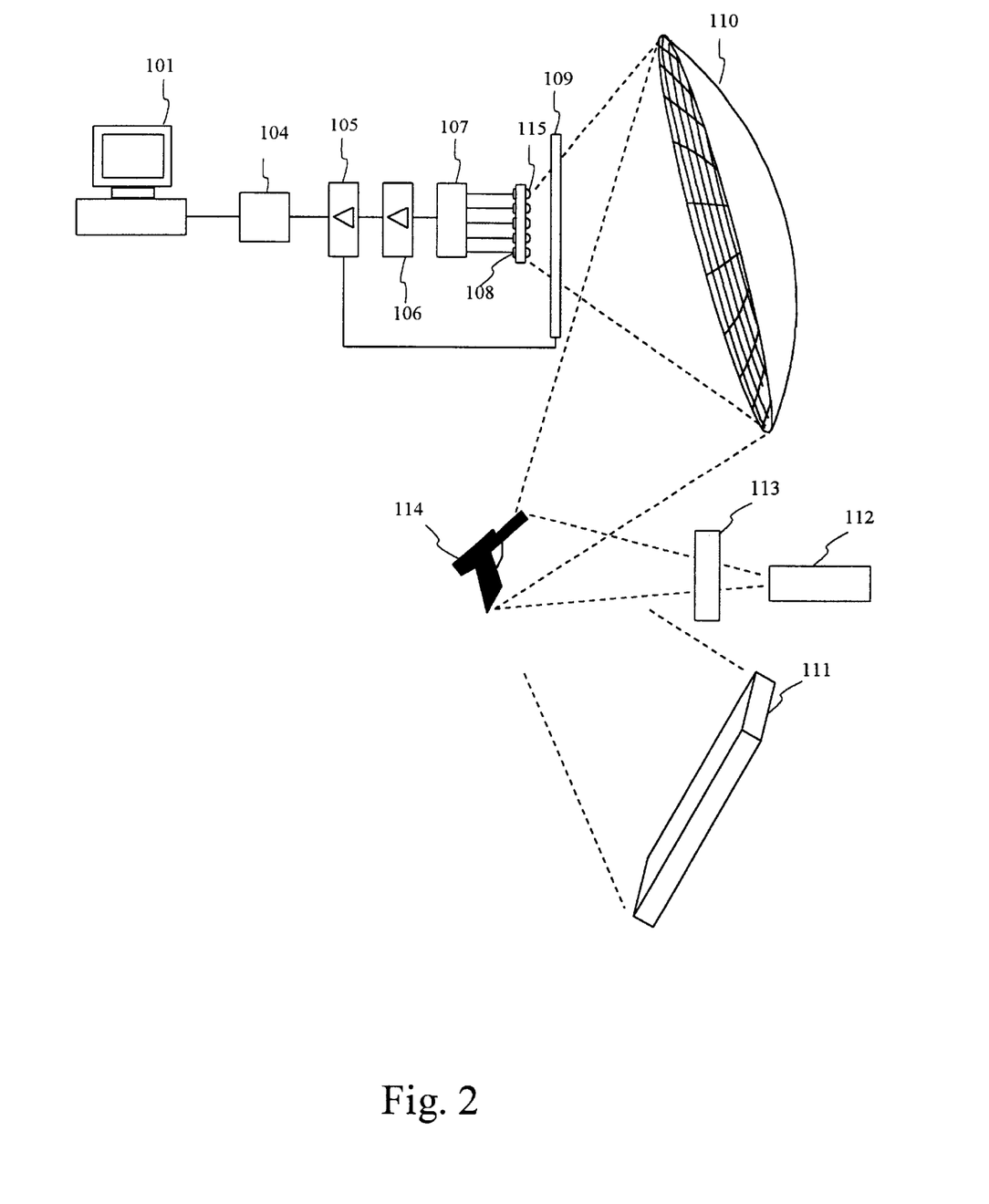
FIG. 2 shows a design for one preferred embodiment of the invention.

FIG. 2 illustrates the design of one preferred embodiment of he invention. In this application, the constrast between an object to be imaged and the environment can be improved by lighting the object by means of a radiation source 112 and a diffuser 113 or by allowing the object to reflect the radiation of a cold body 111. An object can also be imaged passively, without active lighting or without resorting to the use of a cold body. The radiation emitted, reflected, or scattered from the object is collected by means of a wavelength-selective parabolical mirror 110. The mirror 110 concentrates the radiation on a detector matrix 108 positioned at the imaging plane. The radiation applied to the detector matrix 108 is modulated by means of a mechanical or electro-optical chopper 109. The mechanical chopper 109 can be constituted for example by a circular body, having its rim provided with recesses for chopping, as the body is rotated, the radiation observed by the detectors.

The electro-optical chopper 109 may comprise for example a silicon disc, whose charge density is modulated. The functioning of such a solution is based on the fact that the transparency of a silicon disc over a submillimeter wavelength range depends largely on the charge density of the silicon disc. Charges can be formed on a silicon disc for example by means of a laser light or some other known charge injection method. When a bias potential is switched across the disc, the resulting charge carriers migrate to voltage terminals, whereby the charges discharge. Thus, the charge density of a silicon disc can be modulated by modulating a laser light which produces charges.

The substrate of a detector matrix, on the side of the substrate opposite to the detectors, is provided wit substrate lenses 115, one for each detector. In this embodiment, each detector is not provided with one amplifier but, instead, a single amplifier, more specifically a string of amplifiers, amplifies the output signal of more than one detector. For this purpose, the output signal of each detector is carried to a multiplexer 107, which selects one detector output signal at a time to be amplified. The string of amplifiers comprises preferably a preamplifier 106 and a lock-in amplifier 105. The lock-in amplifier also follows the frequency and phase of the chopper 109 and amplifies signals which have a frequency essentially equal to that of the chopper 109. After the lock-in amplifier, the signal is low-pass filtered 104 and carried to a data collection unit 101. Instead of or in addition to the low pass filter 104, the system can also make use of other signal processing functions and methods known to a skilled person. For example, the data collection unit 101 can be a computer 101, which is fitted with an A/D converter for converting the measuring signal to a digital form. The data collection unit 101 preferably stores the measuring signals and on the basis of the measuring signals produces an image of the object on the display of the data collection unit. The data collection unit 101 can also be used for processing the data and for performing image processing functions known to a skilled person for clarifying the image to be presented to the operator of the apparatus. The number of strings of amplifiers consisting of the multiplexer 107, the amplifiers 106, 105, as well as the low pass filter 104 can also be more than one, each string of amplifiers amplifying the signals of a given group of detectors. Since the signal produced by a bolometer is very weak, typically a few nanovolts, the preamplifier 106 must have a low noise level. The preamplifier 106 can be constituted by a low-noise voltage amplifier, for example by the circuit Burt-Brown INA 103 or some other corresponding circuit.

The parabolical reflector 110 builds an image of the various parts of an examined object 114 on the imaging plane. One purpose of the reflector 110 is to se a solid angle as wide as possible to collect radiation emitting or reflecting from an object, more specifically from various resolution elements. In view of maximizing the surface area of an optical, radiation collecting element, it is most preferable to use optics with a low aperture ratio. The object to be image can be relatively large, for example a human being. The imaging distance should preferable be a relatively short, in case of imaging a human being it is preferably for example 3–5 meters for enabling as effective collection as possible of radiation emitted or reflected from the object and for minimizing the influence of atmospheric absorption. A consequence of these conditions is that the detector matrix installed a the imaging plane should preferably be relatively large. In order to minimize distortions caused by a deviation from the optical axis, the detector plane can preferably be made curved, for example parabolical or hyperbolical. This application uses the term detector plane, regardless of the shape of the detector plane, nor does this choice of term restrict the concept to just flat detector planes. Depending on the dimensions of the reflector or lens 110, its focal plane and also the detector, the detector plane can be either convex or concave. Such a detector plane can be preferably compiled by dividing a detector matrix into submatrices, for example 10×10 submatrices, each being provided with a number of detectors, for example 8×8 detectors. Such submatrices can be positioned so as to roughly constitute a desired surface. This type of design has the advantage that the submatrices can be mutually identical and flat, whereby the manufacturing thereof is simple, yet they are capable of constituting at a sufficient accuracy a curved surface of desired shape. The submatrices can also be in shapes other than quadrangle, depending on a desired shape for the detector plane. For example, it is possible to build a spherical cap shaped detector plane in a per se known manner from regular polygons the same way as a geodetic spherical shell.

As shown in FIG. 2, the contrast of an object can be improved by means of active lighting. One possible radiation source 112 feasible for lighting comprises a backward-wave oscillator (BWO). Other possible radiation sources include for example gunn oscillators, various combinations of gunn oscillators and frequency multipliers, IMPATT oscillators, various transistor oscillators, as well as tubular oscillators, such as reflection klystrons. The radiation applied to an object should preferably be diffuse in order to reduce reflections of disturbing brightness. In one preferred embodiment of the invention, the radiation produced by a backward-wave oscillator is diffused, for example by scattering the same by means of dielectric plates, the interior or surface of which is provided with small conducting bodies having a diameter which is in the order of or slightly less than the wavelength of the radiation. Such bodies may comprise for example metal pieces 0.1 to 1 mm in size. The size of such dielectric plates is determined according to the geometry of any given application. In another preferred embodiment of the invention, radiation is scattered by means of perforated metal plates, provided with apertures which, in terms of the diameters thereof, are in the order of or slightly less than the wavelength of the radiation, for example 0.1 to 1 mm in size.

In one preferred embodiment of the invention, the radiation of a radiation source 112, for example a backward-wave oscillator, is focused on a body by means of one or more mirrors or lenses. In such an embodiment, the radiation source 112 is preferably at the focal point of a mirror or lens system whereby, if desired, the radiation can be focused on a small part of an object or diffused to the extent of an entire object. Thus, the source of radiation applied to the object has a diameter which is substantially equal to the diameter or said mirror or lens system. If this diameter of the mirror or lens system is in the same order as the object, the lighting produced by the radiation source and the mirror or lens system is essentially smooth, whereby the number or disturbingly bright reflections will be substantially fewer than what occurs when using a nearly spot-like source of lighting.

In another preferred embodiment of the invention, the radiation of the radiation source 112 is diffused by means of rough mirrors. In such an embodiment, the mirrors may have an RMS roughness in the order of 2 $\mu$m to 100 $\mu$m, whereby the radiation of a submillimeter range reflects form the mirrors in a diffused fashion.

As shown in FIG. 2, one possibility of increasing the detectable contrast of an object is the use of a cold body. The use of a cold body is based on the fact that, for example, the objects hidden underneath the clothing are detected primarily by means of differences in radiation caused by the temperature of a human body and that according to the ambient temperature reflecting from the object. The detectable temperature difference can be increased by varying the ambient temperature or the temperature of part of the ambience for example by means of a cold body, the detectable contrast of an object to be examined improving as it reflects the radiation of this cold body. If the temperature of a cold body to be used is less than 0° C., the cold body should be preferably thermally insulated for preventing the condensation and freezing of water vapour. In such a case, a layer of ice would hamper operation of the system, since the layer of ice will have a surface temperature which is inevitably higher than the temperature of a cold body, and the ice surface has a high emissivity, whereby the whole temperature difference between the cold body and the human body cannot be exploited. Such a cold body can be provided by means of an insulated container of liquid nitrogen. The container material may comprise for example gellular polystyrene or a corresponding material, having a thickness of 10–200 mm, serving as a insulator at the same time. The insulator material must be highly transparent within a submillimeter range. Once suitable insulator material comprises for example polystyrene foam, but also other porous dielectric materials can be used. The insulator may also comprise for example a sufficient number of thin polymer films, for example polyamide films with a thickness of 3 µm–100 µm.

Figure 3:
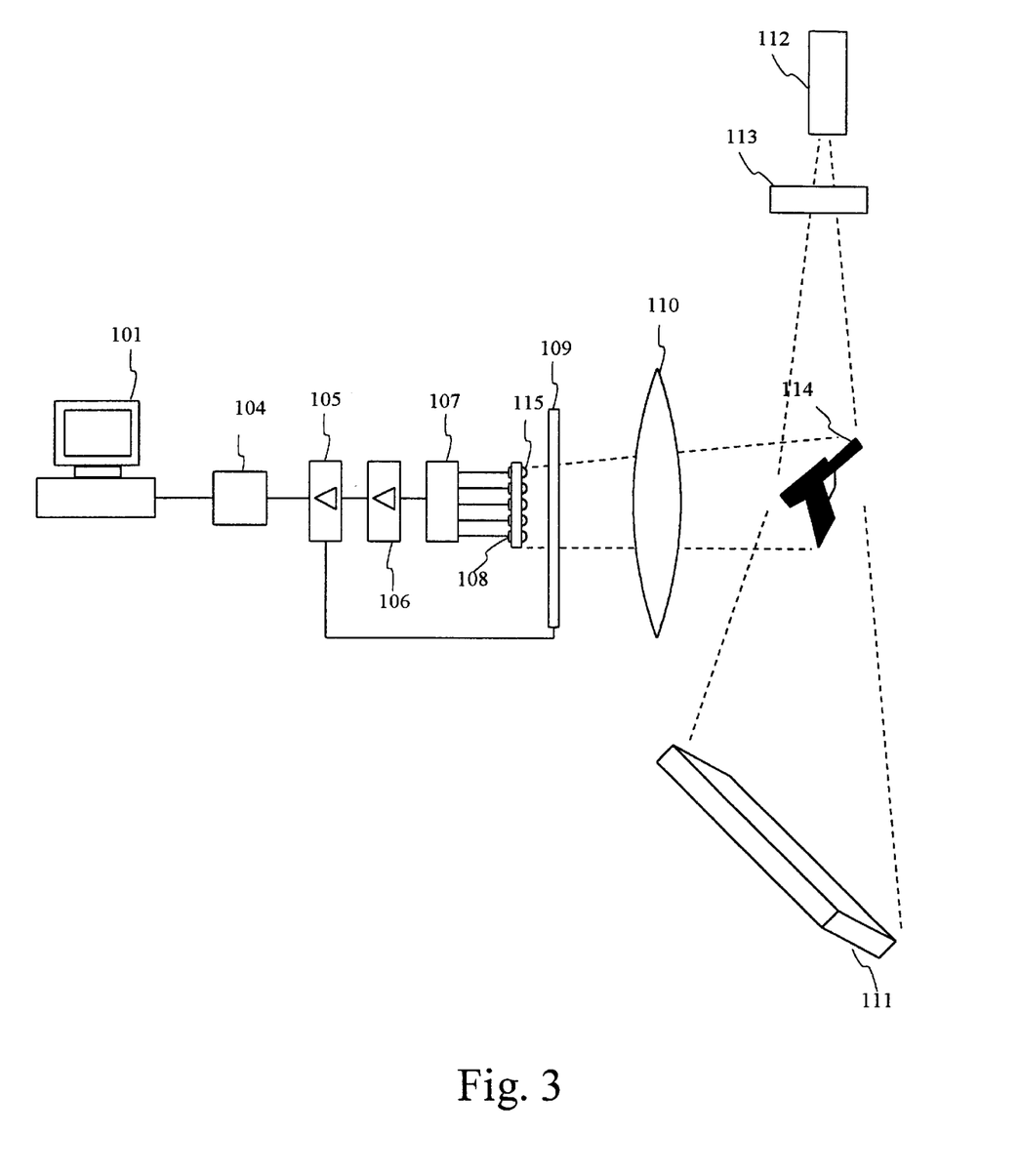
FIG. 3 shows a design for another preferred embodiment of the invention.

FIG. 3 illustrates such a preferred embodiment of the invention, wherein the image-building optical element 110 is not a mirror but, instead, a lens 110. Such a lens may comprise for example a conventional convex lens or a Fresnel lens, well known to a person skilled in the art. In other respects, the embodiment of FIG. 3 has a design and function similar to those of the embodiment of FIG. 2. A suitable lens material can be one of such materials whose index of refraction is higher than that of air and whose transmission is good over a submillimeter wavelength range. Such materials include e.g. PTFE and a number of ceramics.

Figure 4:
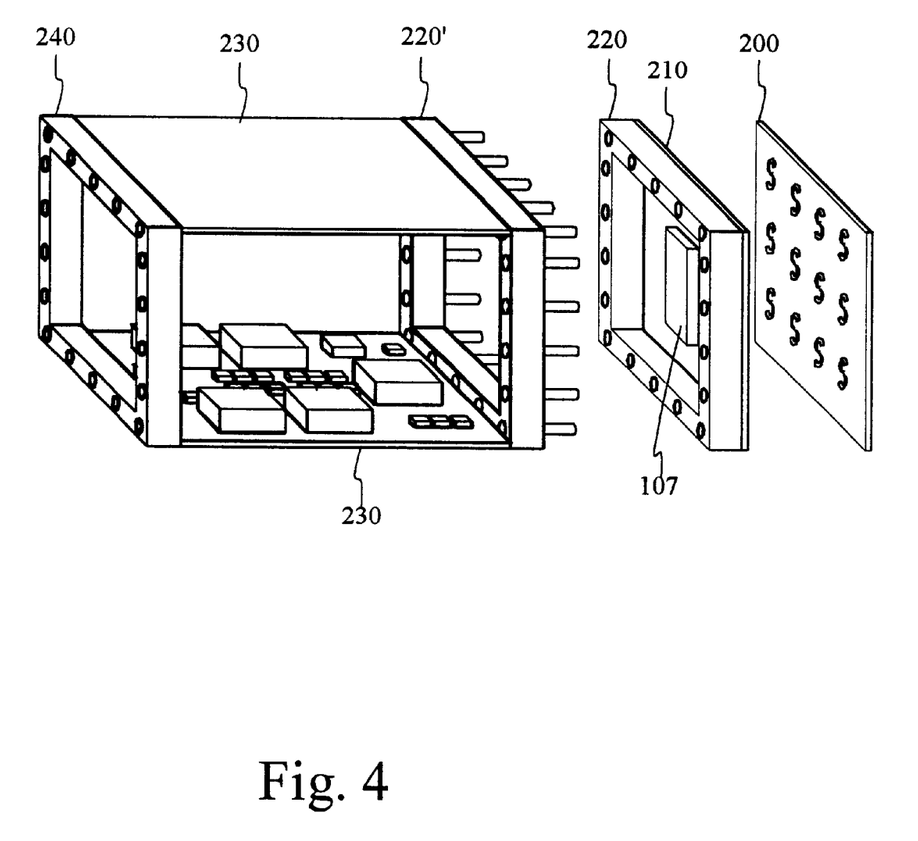
FIG. 4 shows a design for a submatrix unit according to one preferred embodiment of the invention.

FIG. 4 depicts a solution according to one preferred embodiment of the invention for the design of such a submatrix unit. The submatrix unit comprises a detector sub-matrix 200, including one or more detectors. The detector submatrix can be coupled to the rest of the submatrix unit for example by means of flip-chip bonding. Therefore, the detector submatrix 200 is provided with a connection point for each connection to be established, i.e. typically, when using four-point measuring, four connection points per detector. In four-point measuring, the resistance of a bolometer is supplied with a bias current along a first pair of conductors, and a voltage produced by the bias current across the resistance is measured along a second pair of conductors. In a system of the invention it is also possible to use a simpler two-point measurement, wherein a bias current is supplied to a resistance along the same pair of conductors that is used for measuring a voltage acting across the resistance. However, four point measuring is known to be a more accurate method of measuring a resistance. The bias current is preferably essentially constant, whereby the heating effect produced by the bias current remains constant as well. The submatrix unit is provided with a circuit board 210, having its first side, facing the detector submatrix, provided with solder ears consistent with flip-chip technology in alignment with the connection points of the detector submatrix. The other side of the circuit board 210 is provided with a multiplexer 107, electrical contacts between the solder ears and the multiplexer, and bias current conductors for the detectors, which preferably do not extend through the multiplexer, as well as preferably a first element 220 of a terminal 220, 220'. In addition to the multiplexer circuit 107, the circuit board 210 can also be provided with other signal processing functions, such as filters and amplifiers, for example as a part of the multiplexer circuit 107 or as separate circuits (not shown in FIG. 4). Thus, the detector matrix 200, the circuit board 210, as well as signal processing electronics and the terminal 220 included in the circuit board 210 constitute a first segment in the submatrix unit. A second segment in the submatrix unit is constituted by a second element 220' of the terminal 220, 220', one or more amplifier units 230, and a second terminal 240. The amplifier unit 230 comprises preferably a preamplifier 106 described in reference to FIG. 2, a lock-in amplifier 105, and a filter or some other corresponding signal processing unit 104. Then umber of amplifier units 230 may be one or more, preferably for example two, as shown in FIG. 4. Naturally, the number of amplifier units is determined by a particular application and depends primarily on the number of detectors in the detector matrix 200, on the number of strings of amplifiers included in a single amplifier unit, as well as on the number of detectors having their output signals multiplexed for a single string of amplifiers in the multiplexer 107. The design of the invention may also be provided with one string or series of amplifiers per each detector, whereby the multiplexer 107 is unnecessary. The submatrix unit may include a single amplifier unit 230 per each detector, if each of the subamplifier units 230 only includes one string of amplifiers constituted by the preamplifier 106 and the lock-in amplifier 105. The entire submatrix unit can be connected to the rest of the apparatus by means of the terminal 240. Such a submatrix unit design consisting of two segments is also preferably for the reason that, in case one of the detectors is damaged, it is sufficient to replace the first segment, including the detector sub-matrix 200, of that particular submatrix unit.

The most preferred way of implementing the design shown in FIG. 4 is that the amplifier units 230, terminals 220, 220', 240 and circuit board 210 have a width which is equal to or narrower than the detector submatrix 200. In such a solution, the lateral size of the submatrix unit is essentially determined by the detector submatrix 200 only. Thus, a number of submatrix units can be mounted side by side, such that no waste space remains between the detector submatrices but, instead, the gaps between the outermost detectors of two adjacent submatrix units are substantially equal to the gaps between detectors in a single submatrix unit.

Another advantage gained by the use of a submatrix structure is that such a structure can be used for economically compiling large detector matrices. The manufacturing process of antenna coupled bolometers is highly delicate and, thus, when manufacturing large number of detectors for example on a 6 inch semiconductor disc, one disc will easily end up with several inactive detectors. If such a disc were used as a single element, the manufacturing process would have a poor yield since the occurrence of even a few inactive detectors would ruin the entire disc. When such a disc is sectioned into submatrices, such individual submatrices can be discarded, which have one or more inactive detectors. Hence, it is possible to utilize most of even such a semiconductor disc which would have to be discarded, should it be used as a single large matrix.

In a submatrix unit according to another preferred embodiment of the invention, all signal processing functions, such as the above-mentioned preamplifier 106, lock-in amplifier 105 and filter 104, are mounted on the same circuit board 210 with the multiplexer 107. This type of structure or design is preferred in such a case, wherein these signal processing functions are integrated in a very small number of micro-circuits, for example even in the same integrated circuit with the multiplexer 107. The string of amplifiers can also be integrated on the same silicon substrate with the detector, for example in such a way that in connection with each detector is integrated the entire string of amplifiers or a part of the same, for example the preamplifier.

In various embodiments of the invention it is also possible to employ other types of submatrix units than those according to the exemplary design shown in FIG. 4. For example, if the required amplifier and filter assemblies 104, 105, 106 are integrated in a very small number of micro-circuits, the submatrix unit can be nearly flat. Such almost flat submatrix units can be readily used for compiling various curved detector plane solutions.

The lock-in amplifier enables the very low-noise detection of a modulated, wideband THz-class signal. The modulation frequency should preferably be in excess of 300 Hz for suppressing the 1/f noise typical of uncooled bolometers. In one preferred embodiment of the invention, the chopper 109 modulating the radiation applied to a bolometer matrix comprises a rotating or oscillating mechanical shutter for breaking the incoming radiant flux. The modulation can also be carried out by any other implement, capable of periodically suppressing radiation. In such an embodiment of the invention, which is provided with active lighting of an object, the modulation can be applied to radiation lighting the object, whereby the chopper 109 or a corresponding element is located between an object 114 and a radiation source 112. In the embodiment shown in FIG. 2, one preferred location for a chopper is between the backward-wave oscillator 112 and the diffuser 113. In such an embodiment, which is provided with a modulating radiation source, a separate chopper is not required since the necessary modulation of radiation can be implemented by controlling the radiation source, for example by means of a separate modulation control signal or for example by chopping the operating voltage of the oscillator.

According to one preferred embodiment of the invention, the wavelength selectivity in the system can be achieved in a two-stage fashion without a separate filter element. Firstly, the detectors can be designed in such a manner that the sensitivity thereof drops sharply over wavelengths of less than 100 $\mu$m. With antenna coupled bolometers, this can be achieved, as known to a skilled person, by a design and dimensioning of the antenna. Secondly, the reflector 110 can be made wavelength selective. The wavelength selectivity of a reflector can be achieved by making the reflector surface suitably uneven, for example on a scale of about 10 $\mu$m, preferably randomly uneven, whereby the wavelengths shorter than 100 $\mu$m reflect in a diffused fashion but the wavelengths longer than 100 $\mu$m reflect specularly. Another option is to manufacture the reflective surface of the reflector 110 from an electrically conducting mesh or perforated plate, the surface functioning as a wavelength selective reflector. The elimination of radiation with a wavelength of less than 100 $\mu$m is preferred, since the waves less than 100 $\mu$m in length are very poor in penetrating clothing and other dielectric layers.

In case the optical element 110 comprises not a reflector 110 but, instead, a lens 110, said lens can be used for providing an equivalent wavelength selectivity by roughening the surface of the lens 110 to become uneven on a scale of about 10 $\mu$m. Consequently, the wavelengths shorter than about 100 $\mu$m refract from the interface of air and the lens in random directions as a result of the roughening, whereby the optical element 110 does not function as a lens for such wavelengths.

In one preferred embodiment of the invention, the radiation coming from reflector 110 or lens 110 is focused on each antenna coupled bolometer by means of a bolometer-specific quasi-optical element or adaptation element. Such an element comprises preferably a lens, which is attached to a bolometer substrate or made on the substrate and which hereinafter is referred to as a bolometer lens. Another option is to employ a wave tube matrix, having one wave tube for each bolometer. The purpose of an optical element is to maximize the coupling of incoming radiation to he antenna and to minimize reflections from various interfaces, as well as to reduce wasting of radiation energy in various substrate modes as a result of reflections. Such an optical element should preferably be included in the side of a substrate opposite to the bolometer, since the directional pattern of antenna coupled bolometers compiled on a silicon substrate is heavily weighted towards the substrate.

In one preferred embodiment of the invention, such an optical element comprises the use of feed horn assemblies. As an example of such assembly can be mentioned a cone, which is machined in a bolometer substrate in alignment with the bolometer and whose internal surface is metal placed by vapourizing or sputtering, this metal cone concentrating the incoming radiation on the detector.

The bolometer lens can be preferably manufactured from the same material as the substrate for bolometer detectors. In case the employed substrate material is highly resistive silicon, the manufacturing of a lens will be nevertheless expensive, especially since the use of a large detector matrix requires a large number of lenses. In one preferred embodiment of the invention, the bolometer lenses are manufactured from a mixture of a powder which has a high dielectric constant and an epoxy which has a low dielectric constant and causes substantially no losses. Some epoxies appropriate for this purpose are for example epoxies known by the commercial name of Styecast epoxies. The powder having a high dielectric constant may comprise for example silicon carbide or titanium dioxide. Such a mixture can be used for producing bolometer lenses by injecting symmetrical, round drops for example directly on a bolometer substrate or on a separate PTFE plate. The epoxy may be allowed to dry in he manufacturing conditions or the injected drops can be separately baked for expediting the drying process. When using a PTFE-plate, the finished bolometer lenses can be removed from the plate and glued separately to a bolometer substrate. The shape of bolometer lenses can be defined for example by adjusting viscosity of the mixture, possibly by diluting the mixture, by adjusting the distance of an injection nozzle from the substrate, and by means of both baking temperature and injection pressure. This manufacturing method enables the use of an automatic, pneumatic injection system for the manufacture of bolometer lenses in large quantities.

In another preferred embodiment of the invention, a bolometer lens is provided on a bolometer substrate by varying the dielectric constant of the substrate over a suitable range and depth. This can be effected for example by ion implantation or diffusing one or more suitable elements, such as for example oxygen or nitrogen atoms inside the substrate to the depth of one or more wavelengths. Such a solution is highly compact, as it requires no optical elements separate from the substrate.

One option to preclude the development of radiation energy wasting surface modes is to provide the surface of a substrate with a bolometer lens implemented with diffractive binary optics. This can be accomplished by using conventional manufacturing techniques of microcircuits for producing a patterned metal coating consistent with a desired lens pattern.

The bolometer lenses employed in a system of the invention may also comprise nearly flat Fresnel lenses, produced, for example, by means of micromechanical working methods and having a sufficient bandwidth for use in a system of the invention.

In addition to bolometer lenses, the employed adaptation element reducing the development of radiation energy wasting surface modes may also comprise a special anti-reflection sandwich structure. Such a sandwich structure can be produced by providing the surface of a bolometer substrate with layers in such a manner that the dielectric constant of the layers diminishes when progressing from the substrate through the layers towards the surface. In such a sandwich structure, there is no major difference between the dielectric constants of even a single interface and, thus, neither is he index of refraction very high, whereby the total reflection has a boundary angle which, for example, on the interface between the substrate and the first of such layers is substantially larger than on the interface between the substrate and air. This reduces the coupling of incoming radiation energy to surface modes and improves the coupling of incoming radiation energy to the detectors. Such a surface layer, in which the dielectric constant diminishes towards the surface stepwise or almost continuously, can also be implemented for example by ion-implanting or diffusing one or more appropriate elements, such as for example oxygen or nitrogen atoms, in the substrate to various depths. With respect to the solution carried out by using bolometer lenses, this type of assembly has the drawback that such a sandwich structure does not collect and focus radiation on a bolometer from an area larger than the bolometer.

In one preferred embodiment of he invention, the detector matrix detects electromagnetic radiation over more than one wavelength range. Such a detector matrix can be designed by providing a common substrate with bolometers dimensioned for a variety of wavelength ranges. The integration of detectors in a common imaging plane enables imaging simultaneously and focusing on a common image field over two or more wavelength ranges, such as over an infrared range and submillimeter wavelength range. In such an embodiment, a bolometer lens or a corresponding optical element assigned for each bolometer is preferably optimized for a wavelength band detected by this particular bolometer, whereby a common substrate may also be provided with more than one type of bolometer lenses or corresponding elements.

The integration of bolometers of more than one wavelength range on a common substrate can be used for alleviating problems caused by the mutual inductance of antennas in the design of antennas. For example, if between two antenna elements dimensioned for a first wavelength range is an antenna element dimensioned for a second wavelength range, the mutual inductance between these antenna elements dimensioned for the first wavelength range will be lower than in such a case that such element dimensioned for the second wavelength range does not exist therebetween.

For example, the antenna elements of antenna coupled bolometers optimized for various wavelength ranges can be identical in shape but in different sizes, such as those excited for thei own wavelength ranges only by means of the size. The elements of various wavelength ranges can also be of various types. For example, if a first wavelength range requires as wide a wavelength band as possible for use in imaging for maximizing the energy to be collected and a second wavelength range requires a response dependent on the polarization of incoming radiation, the antenna element for the first wavelength range may comprise a spiral element as shown in FIG. 1, but the one used for the second wavelength range may be a dipole element.

A common substrate can also be provided with antenna coupled bolometers dimensioned for a common wavelength range, yet different in terms of certain features, for producing two or more different images over a common wavelength range. For example, a common substrate can be provided with bolometers, directed in two directions perpendicular to each other and fitted with a dipole antenna element, whereby the bolometers directed in different directions receive radiation polarized in different directions. This type of detector matrix can be used, for example, for establishing such an imaging system which is capable of producing a first image by means of horizontally polarized radiation and a second image by means of vertically polarized radiation.

In such a preferred embodiment of the invention, which produces more than one image, the detectors of a different image corresponding to a common picture element can make use of the same bolometer lens. In the above-mentioned example, wherein the system bolometers, directed in a first direction, product a horizontally polarized image and wherein the bolometers, directed in a second direction, produce a vertically polarized image, the system may include one bolometer lens per one pair of bolometers, this pair of bolometers being provided with bolometers corresponding to a common picture element and directed in different directions.

The system of the invention offers a number of benefits over the prior art. With respect to solutions based on traditional radio technology, such as on the use of a heterodyne receiver, the advantages include a shorter imaging wavelength, resulting in a smaller diffraction angle when using the same optics. In addition, the power consumption will be substantially lower, just a few fractions of milliwatt per picture element, as compared with the power in the order of a watt per picture element consumed by a heterodyne receiver.

The manufacture of large, densely packed detector matrices by means of antenna coupled bolometers is less expensive and more reliable that with traditional RF-technique. The detector density of a detector matrix is a critical factor in terms of the image quality, since the optics has a low aperture ratio and, thus, the distortions occurring in directions deviating from the imaging axis restrict dramatically the size of a useful image plane. In addition, the intensity of black body radiation emitted by a body at room temperature is within a submillimeter-wavelength range directly proportional to the square of density, a bolometer operating over a submillimeter-wavelength range detects, according to Rayleigh-Jeans Law, an object at room temperature as brighter than what is achieved by an RF technique based receiver functioning over the 100 GHz range, which is why the solutions making use of antenna coupled bolometers are more effective in passive imaging.

The system of the invention can be used at room temperature and, thus, the use of expensive and sophisticated cooling equipment is not necessary.

The system of the invention can be used not only for searching weapons and smuggled goods but also for submillimeter-range spectroscopy, detection of metals, measurement of thickness and moisture content of dielectric materials, topographical surveys, temperature analysis of an object, and for many other applications. The high speed of an antenna coupled bolometer enables the use thereof in applications requiring speed, wherein the required image speed is very high. One such noteworthy application involves the image heads for missiles self-guided to a target, which in present technology are provided with passive detectors detecting infrared radiation. The number of images points needed in such an application is not large, but the image frequency must be very high. The capability of such guiding equipment can be improved by using a submillimeter-wavelength range, since the air permeance in a submillimeter range is reasonable and the detection occurring in a submillimeter wavelength range is less sensitive for countermeasures, such as smoke and torches, as the submillimeter radiation penetrates rain, fog and smoke more effectively than infrared radiation. The operation of such an image head can be further improved by using a detector matrix, provided with detectors for more than one wavelength range, for example detectors for a far infrared range and a submillimeter wavelength range. The system of the invention can also be used for the passive and active detection of mines and mine resembling objects. Even in this type of application, the system can preferably make use of detectors for at least two wavelength ranges, such as for example detectors for an 8 to 12 μm far infrared range and a submillimeter wavelength range.

The wavelength range 100 μm to 1000 μm mentioned previously is only one example of an advantageous wavelength range. However, the invention is not limited only to that range, since the advantageous properties of that wavelength range extend somewhat outside these limits. Similarly, although in this specification reference is often made to submillimeter wavelengths, the invention is not limited to being used with wavelengths shorter than one millimeter. The previously described advantageous properties of the submillimeter range are not limited to shorter than exactly one millimeter wavelengths, but extend also to longer wavelengths. For example, wavelengths from roughly 100 μm to roughly 3 mm are useful in the applications mentioned in the previous paragraph.

The invention has been described above with reference made to a few preferred embodiments thereof, but it is obvious that the invention can be modified in a plurality of ways within the scope of the inventive concept defined in the annexed claims.

What is claimed is:

1. An imaging system comprising:
   more than one detector, wherein each detector is an antenna coupled bolometer having an antenna element and a bolometer element,
   at least one substantially flat bolometer substrate, wherein said detector is on said substrate,
   an optical element for collecting electromagnetic radiation, wherein said element focuses collected electromagnetic radiation on aid detector, and
   at least one adaptation element between said optical element and said detector for improving the coupling of the radiation directed to said detector.

2. The system of claim 1 wherein said adaptation element is an anti-reflection layer on the surface of said bolometer substrate.

3. The system of claim 1 wherein said adaptation element is a wave tube matrix.

4. The system of claim 1 wherein said adaptation element is a lens.

5. The system of claim 4 having one lens per each antenna coupled bolometer.

6. The system of claim 4 wherein said lens is produced by ion implantation.

7. The system of claim 4 wherein said lens is produced from a mixture of epoxy and powder.

8. The system of claim 1 which detects electromagnetic radiation having a wavelength of about 100 μm to 3 mm.

9. The system of claim 1 wherein at least one antenna coupled bolometer detects electromagnetic radiation of a first wavelength range and at least one antenna coupled bolometer detects electromagnetic radiation of a second wavelength range.

10. The system of claim 1 having more than two bolometer substrates, wherein said bolometer substrates are adapted to provide a detector surface roughly in the shape of a curved surface, said curved surface being substantially the focal plane of said optical element.

11. The system of claim 1 wherein said optical element limits the wavelength band of electromagnetic radiation applied to said bolometer substrate.

12. The system of claim 11 wherein at least one of the surfaces of said optical element is rough, the roughness of said surface being substantially equal to a predetermined value.

13. The system of claim 1 wherein said optical element is a lens.

14. The system of claim 1 wherein said optical element is a mirror.

15. The system of claim 1 further comprising a cold surface for enhancing contrast between an object to be imaged and its background.

16. The system of claim 15 wherein said cold surface is produced by means of a container of liquid nitrogen, said container having thermal insulation wherein said thermal insulation is substantially transparent over the detectable wavelength band.

17. The system of claim 1 further comprising a radiation source and a diffuser for lighting an object to be imaged.

* * * * *

UNITED STATES PATENT AND TRADEMARK OFFICE
CERTIFICATE OF CORRECTION

PATENT NO. : 6,242,740 B1
DATED : June 5, 2001
INVENTOR(S) : Luukanen et al.

It is certified that error appears in the above-identified patent and that said Letters Patent is hereby corrected as shown below:

Column 1,
Line 35, "tis" should read -- this --;
Line 39, "through" should read -- thought --;
Line 56, "he" should read -- the --.

Column 4,
Lines 29 and 32, "he" should read -- the --.

Column 5,
Line 30, "se" should read -- use --;
Line 35, "image" should read -- imaged --;
Line 37, "preferable be a" should read -- preferably be --.

Column 6,
Line 31, "or" should read -- of --.

Column 7,
Lines 63 and 64, "Then umber" should read -- The number --.

Column 8,
line 14, "Preferably" should read -- preferable --;
Line 33, "number" should read -- numbers --.

Column 9,
Line 14, "thediffuser" should read -- the diffuser --;
Line 60, "he" should read -- the --.

Column 10,
Line 24, "he" should read -- the --.

Column 11,
Line 17, "he" should read -- the --;
Line 45, "thei" should read -- their --.

UNITED STATES PATENT AND TRADEMARK OFFICE
CERTIFICATE OF CORRECTION

PATENT NO.    : 6,242,740 B1
DATED         : June 5, 2001
INVENTOR(S)   : Luukanen et al.

It is certified that error appears in the above-identified patent and that said Letters Patent is hereby corrected as shown below:

Column 12,
Line 6, "product" should read -- produce --.
Line 54, "images" should read -- image --.

Column 13,
Line 36, "aid" should read -- said --.

Signed and Sealed this

Twenty-ninth Day of January, 2002

Attest:

JAMES E. ROGAN
*Attesting Officer*     *Director of the United States Patent and Trademark Office*